Figure 6:
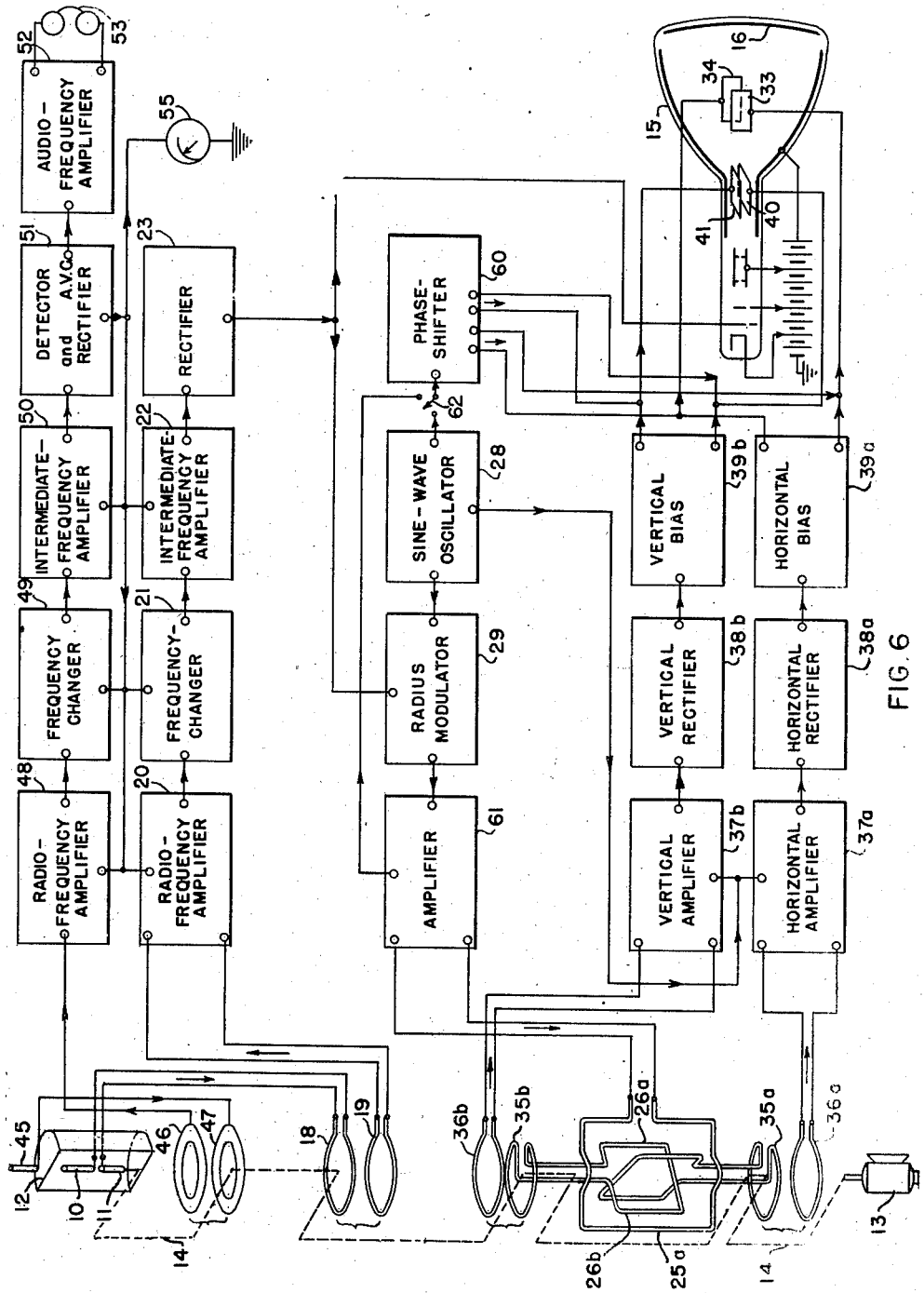

Sept. 10, 1946.　　　　J. K. JOHNSON　　　　2,407,282
SYSTEM FOR INDICATING MECHANICAL MOTION
Filed Dec. 18, 1941　　　3 Sheets-Sheet 1
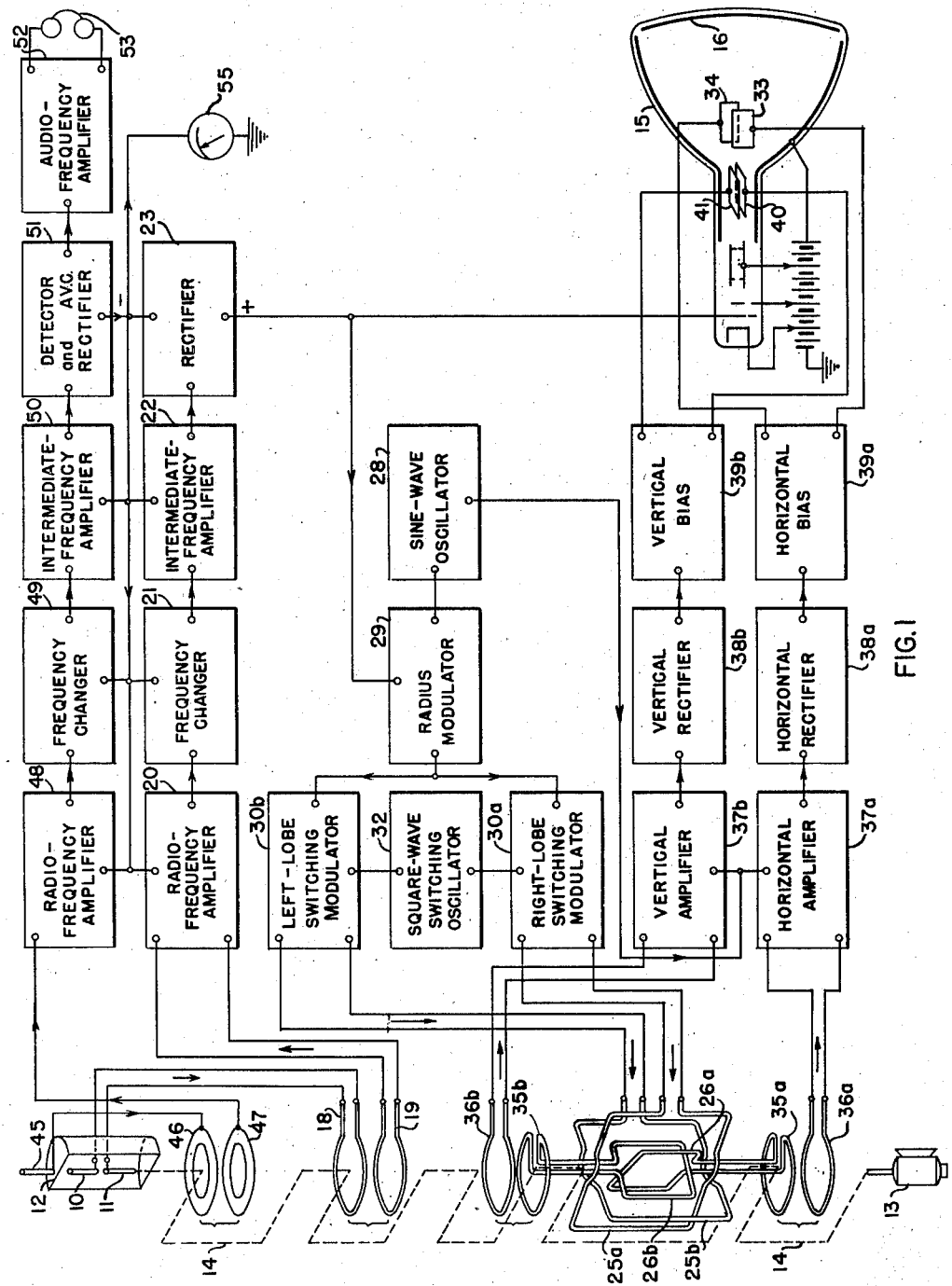
INVENTOR
JOHN KELLY JOHNSON
BY Harry G. Page
ATTORNEY Sept. 10, 1946.  J. K. JOHNSON  2,407,282
SYSTEM FOR INDICATING MECHANICAL MOTION
Filed Dec. 18, 1941  3 Sheets-Sheet 2
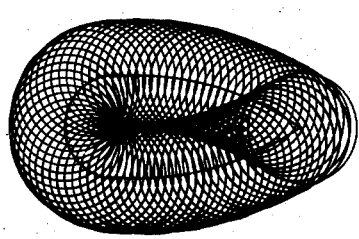
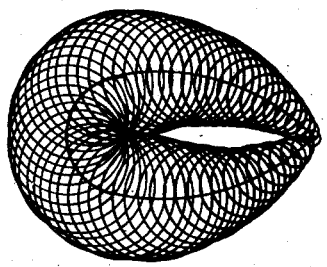
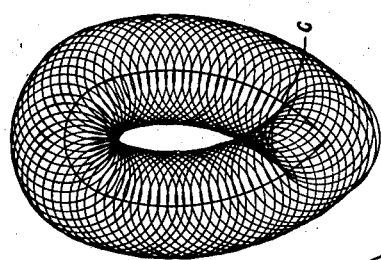
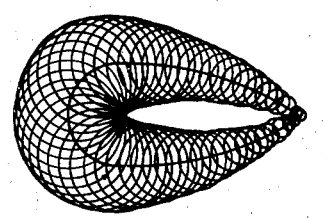
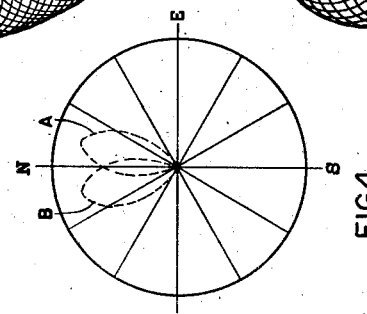
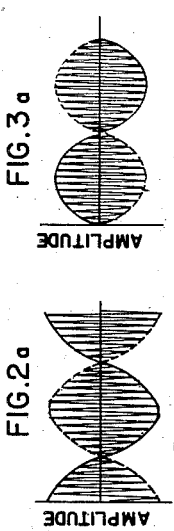
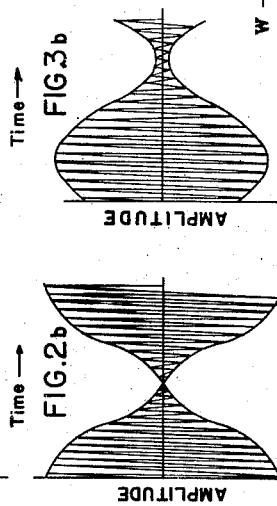
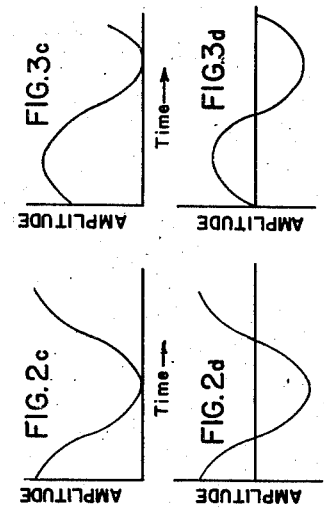
INVENTOR
JOHN KELLY JOHNSON
BY *Harry C. Page*
ATTORNEY Sept. 10, 1946. J. K. JOHNSON 2,407,282
SYSTEM FOR INDICATING MECHANICAL MOTION
Filed Dec. 18, 1941 3 Sheets-Sheet 3

INVENTOR
JOHN KELLY JOHNSON
BY
ATTORNEY

Patented Sept. 10, 1946

2,407,282

UNITED STATES PATENT OFFICE 2,407,282

SYSTEM FOR INDICATING MECHANICAL MOTION

John Kelly Johnson, Deerfield, Ill., assignor, by mesne assignments, to Hazeltine Research, Inc., Chicago, Ill., a corporation of Illinois Application December 18, 1941, Serial No. 423,515

10 Claims. (Cl. 177—351)

The invention relates generally to arrangements for indicating mechanical motion and relates particularly to such arrangements of a type suitable for indicating relative rotary motion between two mechanical members.

Many prior art arrangements have been provided for indicating by electrical means relative motion between two mechanical members. Some of these prior art arrangements have comprised a device having a rotor and stator, one or both of which comprise a single-phase winding or crossed windings, at the mechanical-motion transmitting station, as well as a similar device at the mechanical-motion receiving station where the mechanical motion occurring at the transmitting station is to be indicated. In arrangements of the type under consideration the signals transmitted to the mechanical-motion receiving station generally comprise two carrier waves of the same frequency but modulated differently in the coupling system provided at the mechanical-motion transmitting station in accordance with the frequency of motion. However, it may be very undesirable to use apparatus of the general type under consideration at the mechanical-motion receiving station. For example, it may be desirable to provide at the receiver a cathode-ray tube indicator or an indicator responsive only to the frequency of motion.

Another type of indicating system which has been used is one effectively comprising an alternator for generating a polyphase output at the transmitting station together with a suitable motion-reproducing device such as a cathode-ray tube at the receiving station. In such a system voltages are supplied to the receiving station which can be used directly to deflect the cathode-ray beam of the indicator tube. However, in such a system the response is dependent on the speed of rotation of the device at the transmitting station, a feature which in some cases is very undesirable.

It is an object of the invention, therefore, to provide an improved arrangement for indicating mechanical motion between two members which is not subject to one or more of the disadvantages of prior art arrangements mentioned above.

It is still another object of the invention to provide a system for indicating relative motion between two members in which the apparatus required at the motion-transmitting sending station may be light in weight and may require very little space.

In accordance with the invention, a system for indicating relative mechanical motion comprises two members adapted to have relative motion therebetween and impedance-coupling means having relatively movable primary and secondary elements the relative position of which determines the electrical coupling therebetween. The system also comprises a means for effectively mechanically coupling the primary element to one of the above-mentioned members, means for effectively mechanically coupling the secondary element to the other of the above-mentioned members, and means for supplying to the primary element oscillations of a frequency much greater than the frequency of the motion between the two above-mentioned members, whereby there are applied to the secondary element oscillations the amplitude of which is modulated in accordance with the relative motion between the two above-mentioned members. The system additionally includes means coupled with the secondary element for synchronously rectifying the oscillations coupled thereto to obtain a unidirectional voltage pulsating in accordance with the motion between the two members, as well as means for utilizing the unidirectional voltage for producing a synchronous indication of the motion between the members.

For a better understanding of the present invention, together with other and further objects thereof, reference is had to the following description taken in connection with the accompanying drawings, and its scope will be pointed out in the appended claims.

Figs. 1 and 6 of the drawings are schematic circuit diagrams of radiated-signal direction finders, each including a system in accordance with an embodiment of the present invention for indicating relative mechanical motion; Figs. 2a–2d, inclusive, and Figs. 3a–3d, inclusive, comprise graphs utilized to explain the operating characteristics of the motion-indicating system of Fig. 1; while Fig. 4 and Figs. 5a–5d, inclusive, represent various patterns which may be procured by the direction finders illustrated when utilizing a motion-indicating system in accordance with the invention.

Referring now more particularly to Fig. 1 of the drawings, the radiated-signal direction finder there illustrated incorporates a system in accordance with the present invention for indicating relative motion between two mechanical members. The direction finder itself, however, is the subject matter of a joint application, Serial No. 423,514, filed concurrently herewith in the names of Harold A. Wheeler and John Kelly Johnson, and comprises a receiving pick-up system or antenna system having a directive pattern. Such receiving antenna system is provided by the dipole antenna 10, 11 and the reflector 12. The direction finder also comprises means for rotating the directive pattern of the antenna system 10, 11. This means comprises a motor 13 mechanically coupled, as indicated by the dotted line 14, to the antenna system 10, 11 and its associated reflector 12. The signal output of the antenna 10, 11 is coupled to a receiving system through a pair of inductively-coupled loops 18 and 19, loop 19 being stationary and loop 18 being driven, as indicated by the dotted line 14, with the antenna system 10, 11 and its associated reflector 12. The receiver coupled to antenna system 10, 11 comprises, in cascade, a radio-frequency amplifier 20 of one or more stages, a frequency changer or oscillator-modulator 21, an intermediate-frequency amplifier 22 of one or more stages, and a rectifier 23. There is also comprised in the arrangement of Fig. 1 a line-tracing device which includes a cathode-ray tube 15 and means for causing the beam of the tube to traverse a circle on the fluorescent screen 16 on the end of the cathode-ray tube.

The arrangement also comprises means for synchronizing the line-tracing device or the rotation of the beam of the cathode-ray tube 15 with the rotation of the directive pattern of the antenna system 10, 11. The means for rotating the beam of the cathode-ray tube 15 and for synchronizing the scanning spot thereof with the antenna system 10, 11 comprises a system in accordance with the present invention for indicating relative mechanical motion between two members adapted to have relative motion therebetween. These members may be considered to be, for example, the stator and the rotor of the motor 13. Impedance-coupling means are provided in the motion-indicating system having relatively movable primary and secondary elements, the relative positions of which determine the electrical coupling therebetween. Such impedance-coupling means, in the embodiment illustrated, comprise primary elements 25a and 25b and secondary elements 26a and 26b. The relative position of the respective primary and secondary elements determines the electrical coupling therebetween. The primary elements 25a and 25b are stationary and are angularly spaced by a relatively small amount, while the secondary elements 26a and 26b are angularly spaced at right angles to each other and are adapted to be rotated by the motor 13, as indicated by the dotted line 14.

A sine-wave oscillator 28 is provided for supplying to the primary elements 25a and 25b oscillations of a period much less than the effective minimum period of the motion between the respective primary and secondary elements. Sine-wave oscillator 28 is connected through a radius modulator 29 and a right-lobe switching modulator 30a, to the primary element 25a and is connected through the radius modulator 29 and a left-lobe switching modulator 30b, to the primary element 25b. In order to cause either the right-lobe switching modulator 30a or the left-lobe switching modulator 30b to be effective, there is provided a square-wave switching oscillator 32 having output circuits connected, respectively, to units 30a and 30b and adapted to cause these units to be alternately operative at a frequency which is high with respect to the frequency at which the antenna system 10, 11 is rotated. Secondary element 26a is connected to horizontal deflecting plates 33, 34 of cathode-ray tube 15 by means of a coupling system comprising inductively-coupled loops 35a, 36a, a horizontal amplifier 37a, a horizontal rectifier 38a and a horizontal bias 39a. The loop 35a is connected directly to the terminals of the secondary element 26a and is adapted to be rotated therewith by motor 13 as indicated by the dotted line 14, the loop 36a being stationary.

Similarly, the vertical deflecting plates 40, 41 of cathode-ray tube 15 are connected to loop 26b through a system comprising a rotating loop 35b, a stationary loop 36b, a vertical amplifier 37b, a vertical rectifier 38b and a vertical bias 39b.

The signal output of rectifier 23 is applied to the radius modulator 29, and in order to effect synchronous detection in rectifiers 38a and 38b, sine-wave oscillations developed in oscillator 28 are also applied to the rectifiers 38a and 38b through the horizontal amplifier 37a and the vertical amplifier 37b, respectively. The amplitude of the oscillations supplied to units 37a and 37b from oscillator 28 is greater than that supplied to these units from elements 36a and 36b and of substantially the same phase. This phase relationship is not very critical but must be within 90° and is preferably within about 20°. The signal output of rectifier 23 is also applied to the control grid of the cathode-ray tube 15 and suitable operating potentials are provided therefor in a manner which is, per se, well understood in the art.

Inasmuch as the directive antenna system 10, 11 has a directive radiation pattern the orientation of which varies relative to the direction of reception of a desired signal, the amplitude of the signal utilized in units 20 and 23, inclusive, varies in accordance with this relative orientation and additionally in accordance with the amplitude of the radiated signal being received. In order to eliminate such amplitude variations in accordance with the amplitude of the radiated signal, a control system is provided for the receiver comprising units 20 to 23, inclusive. This control system, which forms the subject matter of copending application Serial No. 423,516 filed concurrently herewith in the name of Harold A. Wheeler, comprises a second antenna system 45 having a radiation pattern which is less directive than that of the first antenna system 10, 11, means connected with the second antenna system 45 for deriving, in response to the desired signal received thereby, a control effect which varies primarily in accordance with the amplitude of the radiated signal being received, and means for utilizing the derived control effect to adjust an operating characteristic of the receiver comprising units 20 to 23, inclusive. As illustrated in the drawings the antenna 45 comprises a vertical conductor mounted on the reflector 12, adapted to be rotated therewith, and capacitively coupled through a rotating plate 46 and a stationary plate 47 to the input circuit of a receiver. This last-named receiver comprises, in cascade, a radio-frequency amplifier 48 of one or more stages, a frequency changer or oscillator-modulator 49, an intermediate-frequency amplifier 50 of one or more stages, a detector and A. V. C. rectifier 51, an audio-frequency amplifier 52 of one or more stages, and a sound-signal reproducing device 53. A voltage from the A. V. C. rectifier in unit 51 is applied to one or more of the tubes of stages 48, 49 and 50 to maintain the amplitude of the signal input to detector 51 within a relatively narrow range for a wide range of received signal amplitudes, and, additionally, the A. V. C. rectifier in unit 51 is utilized to control the gain of stages 20, 21 and 22 to maintain the amplitude of the signal input to rectifier 23 within a relatively narrow range for a wide amplitude range of the radiated signal being received insofar as fading of the received signal is concerned. A suitable tuning meter 55 is preferably provided for the two receivers 20 to 23, inclusive, and 48 to 53, inclusive, which may comprise a high-resistance voltmeter coupled across the A. V. C. source of unit 51.

Referring now to the operation of the direction finder of Fig. 1, it will be seen that the arrangement comprises the directive antenna system 10, 11 having a directive pattern, and that the motor 13 is adapted to rotate the antenna system 10, 11 to rotate the directive pattern. The line-tracing device 15, in the absence of a received signal, is effective to trace a circular path on the fluorescent screen 16. In order to explain the manner in which this is done it will first be assumed that the right-lobe switching modulator 30a is in an operative condition and that the square-wave switching oscillator 32 is disconnected therefrom. Under these conditions oscillations from oscillator 28 are applied, through radius modulator 29 which, in the absence of a received signal as assumed, functions as an amplifier, and the right-lobe switching modulator 30a, to the primary element 25a, the relative position of which with respect to the secondary element 26a determines the electrical coupling between these primary and secondary elements. There are thus applied to the secondary element 26a oscillations the amplitudes of which are modulated in accordance with the relative motion between elements 25a and 26a. The oscillations so induced in element 26a are represented by the curves of Fig. 2a and correspond to the oscillations produced by sine-wave oscillator 28 modulated in amplitude and polarity in accordance with the relative motion between members 25a and 26a. The oscillations represented by the curves of Fig. 2a may be recognized as a modulated signal the modulation components of which can only be derived by a synchronous detection process by which the correct percentage of modulation is restored to the signal. These oscillations are coupled to the rectifier 38a through the elements 35a, 36a and 37a. To restore the correct percentage of modulation to these oscillations, the sine waves provided by oscillator 28 are applied to the rectifier 38a through the horizontal amplifier 37a and are effective to transform the oscillations of Fig. 2a into a signal which is modulated in amplitude only by an amount equal to or less than 100%, as indicated by the curves of Fig. 2b of the drawings. The horizontal rectifier 38a derives the modulation component of this signal which varies in accordance with the relative motion between the two members 25a and 26a, this component being illustrated by the curve of Fig. 2c of the drawings. The signal output of horizontal rectifier 38a is converted to a signal with zero average value, as illustrated by the curve of Fig. 2d of the drawings, by superposition of a horizontal bias potential in unit 39a and is applied to the horizontal deflecting plates 33, 34. The voltage applied to deflecting plates 33, 34, assuming a uniform speed of rotation of motor 13, is, therefore, a sine wave having a period equal to the period of rotation of motor 13.

Inasmuch as the vertical deflecting system is substantially the same as the horizontal deflecting system, a similar voltage is applied to deflecting plates 40, 41, which voltage, however, is displaced in phase by 90 degrees from the voltage applied to deflecting plates 33, 34 due to the 90-degree physical displacement between the elements 26a and 26b. The curves of Figs. 3a to 3d are generally similar, therefore, to the curves of Figs. 2a to 2d, respectively, and represent corresponding potentials of the vertical deflecting system. The arrangement just described, therefore, serves to cause the beam of the cathode-ray tube 15 to trace a circular path on the fluorescent screen 16 of tube 15. In summary, therefore, the arrangement just described comprises a system for indicating mechanical motion comprising two members adapted to have relative motion therebetween and these members may be considered to be the rotor and stator of motor 13. The system thus comprises an impedance means having a primary element 25a and a secondary element 26a, which are relatively movable and the relative position of which determines the electrical coupling therebetween. The arrangement also comprises means for effectively mechanically coupling the secondary element 26a to the rotor of the motor 13 and it will be seen that the primary element 25a and the stator of motor 13 may be considered to be effectively mechanically coupled for the reason that each of these two units is stationary. Additionally, the system comprises the sine-wave oscillator 28 for supplying to the primary element 25a oscillations of a frequency much greater than the effective maximum frequency of the motion between the two elements 25a and 26a, whereby there are applied to the secondary element 26a oscillations the amplitudes of which are modulated in accordance with the relative motion between the stator and rotor of motor 13. Means comprising rectifier 38a and the amplifier and bias unit associated therewith are coupled to the secondary element 26a for synchronously rectifying the oscillations coupled thereto from the primary element 25a to obtain a unidirectional voltage pulsating in accordance with the motion between the stator and the rotor of motor 13 and means, including the cathode-ray line-tracing device 15, is provided for utilizing the unidirectional voltage so produced for producing a synchronous indication of one component of the motion between the rotor and stator of motor 13.

Before considering the effect of the square-wave switching oscillator 32 upon the arrangement just described, the effect of the signal applied from rectifier 23 to the radius modulator 29 will be considered. The amplitude of this signal varies in accordance with the directive-radiation pattern of antenna system 10, 11 and is maximum when the open face of the reflector 12 faces the transmitter being received. The signal from rectifier 23 is applied to the modulator 29 to vary the amplitude of the oscillations applied to units 30a and 30b. This effectively varies in accordance with the signal from rectifier 23 the percentage of modulation of the signals applied to the rectifiers 38a, 38b so that the radius of the circle traced by the beam of tube 15 decreases with decreasing amplitude of the received signal. In this way the arrangement is effective to trace upon the fluorescent screen 16 a pattern representing the directive-radiation pattern of antenna system 10, 11. One such pattern is represented by the dotted line A of Fig. 4, the solid-line circle representing the end of the cathode-ray tube 15. Compass points, as indicated, may be provided on the end of the cathode-ray tube 15. It will be understood, however, that in the arrangement just described the line traced by cathode-ray tube 15 is a continuous line and is not dotted as shown.

If now it is assumed that the right-lobe switching modulator 30a is inactive, the left-lobe switching modulator 30b is active, and the square-wave switching modulator 32 is disconnected from the switching modulator 30b, it will be seen that the only change in the system just described is effectively a physical rotation of the primary element which induces oscillations into the secondary elements 26a and 26b. In the case under present consideration, the primary element 25b is the effective member. Under the conditions just assumed, therefore, the line-tracing device 15 of Fig. 1 is effective to trace a directive pattern displaced from the one previously described and may, for example, trace full-line directive patterns of the type represented by curve B of Fig. 4. Preferably, the angular relationships between the elements 25a, 25b, 26a and 26b, on the one hand, and the reflector 12 on the other, are so proportioned that the point of overlap of the directive patterns A and B represents the true direction of the transmitter being received.

If now the effect of square-wave switching oscillator 32 upon the circuit of Fig. 1 is considered, it will be seen that the primary elements 25a and 25b are alternately effective in the system, these elements being switched at a very high frequency by the switching oscillator 32. In place of tracing continuous lines upon the cathode-ray tube as described, when the square-wave switching oscillator 32 is utilized a portion of one pattern is first traced, a portion of the next pattern is then traced, etc., and the patterns which are visible on the fluorescent screen 16 are of dotted form, as illustrated in Fig. 4. The effect of the signal derived from rectifier 23 and applied to the control grid of cathode-ray tube 15 is to cause the outer portions of the directive loops traced on screen 16 to be as bright as the inner portions of the loops, even though the spot is moving more rapidly.

In the arrangement just described a slow variation of the amplitude of the radiated signal which is intercepted by antennas 10 and 11 would be also effective to shift the pattern traced by line-tracing device 15 and the operation of the arrangement will be as described only when there is no such variation of the amplitude of the radiated signal which is being intercepted. It is for the purpose of compensating for such slow variations of amplitude that the automatic amplification control system for units 20, 21 and 22 is provided. The receiver comprising units 48 to 53, inclusive, operates in a conventional manner, and it will be understood that this receiver, as well as the receiver comprising units 20 to 23, is adapted to be tuned to the desired signal by means of tuning meter 55. The automatic amplification control effect, which is effective to vary the gain of one or more of stages 20, 21 and 22, is effective at least partially to compensate for slow amplitude variations of the radiated signal which is intercepted by the antenna system 10, 11.

The arrangement of Fig. 6 is generally similar to the arrangement of Fig. 1 and similar circuit elements in the two figures have identical reference numerals. The arrangement of Fig. 6 differs from the arrangement of Fig. 1 primarily in that square-wave switching oscillator 32 and its associated elements have been omitted and in that a different arrangement comprising a phase shifter 60 and associated connections has been added in order to provide a pattern on screen 16 which has intersecting lines suitable for indicating the direction of reception of a received signal. The circuit of Fig. 6 thus comprises only a single primary coupling element 25a which is connected to sine-wave oscillator 28 through radius modulator 29 and an amplifier 61. Phase shifter 60 is adapted, by means of a two-position switch 62, to be connected directly to sine-wave oscillator 28 or to this oscillator through the radius modulator 29 and the amplifier 61. The phase shifter 60 is so designed as to supply to the respective sets of deflecting plates of cathode-ray tube 15, two sine-wave voltages which are 90 degrees apart, these voltages being superposed on the deflecting voltages supplied through units 39a and 39b, respectively.

In considering the operation of the circuit of Fig. 6 and neglecting for the moment the operation of phase shifter 60, it will be seen that the arrangement is effective to plot the directive pattern of the antenna system 10, 11 upon the screen 16 of the cathode-ray tube in a manner similar to that described above. In other words, this plot may be of the form indicated by the line C of Fig. 5a. If switch 62 is now assumed to be in such a position as to couple the phase shifter 60 directly to the sine-wave oscillator 28, there is superposed on the deflection potentials applied to the pairs of deflecting plates of cathode-ray tube 15 two sine-wave voltages which are effective additionally to impart to the indicating spot of the cathode-ray tube 15 a circular motion at the frequency of oscillator 28, which frequency is high with respect to the frequency at which the antenna system is rotated. The pattern traced by the spot under the condition assumed may take the form illustrated in Fig. 5a, neglecting the curve C, and it is thus seen that the intersecting lines in the upper middle region of this pattern are sharply indicative of the direction of reception of the radiated signal intercepted by antenna system 10, 11.

In one preferred embodiment of the arrangement of Fig. 6 the curvature at the peak of the circular motion imparted through phase shifter 60 is substantially equal to the minimum effective curvature of the directive pattern of the antenna system 10, 11 upon the screen 16, and this is the condition which is represented by the pattern of Fig. 5a. In other words, the circular motion which is imparted to the scanning spot of tube 15 through the phase shifter 60 is of curvature substantially equal to the minimum effective curvature of the directive pattern indicated by the curve C.

In another preferred embodiment of the invention the curvature of the circular motion so imparted is greater than the effective minimum curvature at the peak of the directive pattern on the screen 16 and, under such conditions, the arrangement of Fig. 6 may be effective to trace a pattern on the screen 16 as represented by Fig. 5b.

If the switch 62 is now operated so that phase shifter 60 is connected to the oscillator 28 through the radius modulator 29 and the amplifier 61, it will be seen that the radius of the circular motion imparted to the scanning spot by phase shifter 60 is varied in accordance with the amplitude of the bias voltage provided from rectifier 23. Under these conditions the pattern of Fig. 5a is changed to that of Fig. 5c or the pattern of Fig. 5b is changed to that of Fig. 5d.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for indicating relative mechanical motion comprising, two members adapted to have relative motion therebetween, an impedance-coupling means having relatively movable primary and secondary elements the relative position of which determines the electrical coupling therebetween, means for effectively mechanically coupling said primary element to one of said members, means for effectively mechanically coupling said secondary element to the other of said members, means for supplying to said primary element oscillations of a frequency much greater than the effective maximum frequency of said motion between said two members, whereby there are applied to said secondary element oscillations the amplitudes of which are modulated in accordance with said relative motion between said two members, means connected with said secondary element for synchronously rectifying said oscillations coupled thereto to obtain a unidirectional voltage pulsating in accordance with said motion, and means for utilizing said unidirectional voltage for producing a synchronous indication of said motion between said two members.

2. A system for indicating relative mechanical motion comprising, two members adapted to have relative motion therebetween, inductive-coupling means having relatively movable primary and secondary elements the relative position of which determines the electrical coupling therebetween, means for effectively mechanically coupling said primary element to one of said members, means for effectively mechanically coupling said secondary element to the other of said members, means for supplying to said primary element oscillations of a frequency much greater than the effective maximum frequency of said motion between said two members, whereby there are applied to said secondary element oscillations the amplitudes of which are modulated in accordance with said relative motion between said two members, means connected with said secondary element for synchronously rectifying said oscillations coupled thereto to obtain a unidirectional voltage pulsating in accordance with said motion, and means for utilizing said unidirectional voltage for producing a synchronous indication of said motion between said two members.

3. A system for indicating relative mechanical motion comprising, two members adapted to have relative motion therebetween, an impedance-coupling means having relatively movable primary and secondary elements the relative position of which determines the electrical coupling therebetween, means for effectively mechanically coupling said primary element to one of said members, means for effectively mechanically coupling said secondary element to the other of said members, an oscillator for supplying to said primary element oscillations of a frequency much greater than the effective maximum frequency of said motion between said two members, whereby there are applied to said secondary element oscillations the amplitudes of which are modulated in accordance with said relative motion between said two members, means connected with said secondary element for synchronously rectifying said oscillations coupled thereto to obtain a unidirectional voltage pulsating in accordance with said motion, and means for utilizing said unidirectional voltage for producing a synchronous indication of said motion between said two members.

4. A system for indicating relative mechanical motion comprising, two members adapted to have relative motion therebetween, an impedance-coupling means having relatively movable primary and secondary elements the relative position of which determines the electrical coupling therebetween, means for effectively mechanically coupling said primary element to one of said members, means for effectively mechanically coupling said secondary element to the other of said members, means for supplying to said primary element oscillations of a frequency much greater than the effective maximum frequency of said motion between said two members, whereby there are applied to said secondary element oscillations the amplitudes of which are modulated in accordance with said relative motion between said two members, synchronous rectifying means connected with said means for supplying oscillations to said primary element and connected to said secondary element with such relative phase as to obtain from said rectifying means a unidirectional voltage pulsating in accordance with said motion, and means for utilizing said unidirectional voltage for producing a synchronous indication of said motion between said two members.

5. A system for indicating relative mechanical motion comprising, two members adapted to have relative rotary motion therebetween, an impedance-coupling means having relatively movable primary and secondary elements the relative position of which determines the electrical coupling therebetween, means for effectively mechanically coupling said primary element to one of said members, means for effectively mechanically coupling said secondary element to the other of said members, means for supplying to said primary element oscillations of a frequency much greater than the effective maximum frequency of said motion between said two members, whereby there are applied to said secondary element oscillations the amplitudes of which are modulated in accordance with said relative motion between said two members, means connected with said secondary element for synchronously rectifying said oscillations coupled thereto to obtain a unidirectional voltage pulsating in accordance with said motion, a cathode-ray tube, means for utilizing said pulsating unidirectional voltage to deflect the cathode-ray beam of said tube in one direction, and means for deriving a similar phase-displaced unidirectional pulsating voltage for displacing said beam normal to said first direction to produce a synchronous indication of said rotary motion between said two members.

6. A system for indicating relative mechanical motion comprising, two members adapted to have relative rotary motion therebetween, an impedance-coupling means having two secondary elements which are substantially 90 degrees displaced and a primary element relatively movable with respect to said secondary elements, the relative positions of said secondary elements with respect to the primary element determining the electrical coupling between the primary element and the respective secondary elements, means for effectively mechanically coupling said primary element to one of said members, means for effectively mechanically coupling said secondary elements to the other of said members, means for supplying to said primary element oscillations of a frequency much greater than the effective maximum rotational frequency of said motion between said two members, whereby there are applied to said secondary elements oscillations the amplitudes of which are modulated in accordance with said relative motion between said two members, means respectively connected to each of said secondary elements for synchronously rectifying said oscillations coupled thereto to obtain unidirectional voltages pulsating in accordance with said motion, and means for utilizing said unidirectional voltages for producing a rotary synchronous indication of said motion between said two members.

7. A system for indicating relative mechanical motion comprising, two members adapted to have relative rotary motion therebetween, an impedance-coupling means having two secondary elements which are substantially 90 degrees displaced and a primary element relatively movable with respect to said secondary elements, the relative positions of said secondary elements with respect to the primary element determining the electrical coupling between the primary element and the respective secondary elements, means for effectively mechanically coupling said primary element to one of said members, means for effectively mechanically coupling the said secondary elements to the other of said members, means for supplying to said primary element oscillations of a frequency much greater than the effective maximum frequency of said motion between said two members, whereby there are applied to said secondary elements oscillations the amplitudes of which are modulated in accordance with said relative motion between said two members, means respectively connected to each of said secondary elements for synchronously rectifying said oscillations coupled thereto to obtain unidirectional voltages pulsating in accordance with said motion, a cathode-ray tube, and means for respectively utilizing each of said pulsating unidirectional voltages to deflect the cathode-ray beam of said tube in two directions normal to each other to produce a rotary synchronous indication of said motion between said two members.

8. A system for indicating relative mechanical motion comprising, two members adapted to have relative motion therebetween, an impedance-coupling means having relatively movable primary and secondary elements the relative position of which determines the electrical coupling therebetween, means for effectively mechanically coupling said primary element to one of said members, means for effectively mechanically coupling said secondary element to the other of said members, means for supplying to said primary element oscillations of a frequency much greater than the effective maximum frequency of said motion between said two members, whereby there are applied to said secondary element oscillations the amplitudes of which are modulated in accordance with said relative motion between said two members, synchronous rectifying means, means for supplying said first-named oscillations to said rectifying means, means for connecting said rectifying means to said secondary element to supply oscillations to said rectifying means of an amplitude substantially less than those of said first-named oscillations supplied to said rectifying means and of substantially the same phase to obtain from said rectifying means a unidirectional voltage pulsating in accordance with said motion, and means for utilizing said unidirectional voltage for producing a synchronous indication of said motion between said two members.

9. A system for indicating relative mechanical motion comprising, two members adapted to have relative rotary motion therebetween, an impedance-coupling means having two secondary elements which are substantially 90 degrees displaced and a primary element relatively movable with respect to said secondary elements, the relative positions of said secondary elements with respect to the primary element determining the electrical coupling between the primary element and the respective secondary elements, means for effectively mechanically coupling said primary element to one of said members, means for effectively mechanically coupling said secondary elements to the other of said members, means for supplying to said primary element oscillations of a frequency much greater than the effective maximum frequency of said motion between said two members, whereby there are applied to said secondary elements oscillations the amplitudes of which are modulated in accordance with said relative motion between said two members, means respectively connected to each of said secondary elements for synchronously rectifying said oscillations applied thereto to obtain unidirectional voltages pulsating in accordance with said motion, a cathode-ray tube, means for respectively utilizing each of said pulsating unidirectional voltages to deflect the cathode-ray beam of said tube in two directions normal to each other to produce a rotary synchronous indication of said motion between said two members, and means for modulating the voltage supplied to each of said rectifying means to modulate the radius of the rotary synchronous indication provided by said cathode-ray beam.

10. A system for indicating relative mechanical motion comprising, two members adapted to have relative rotary motion therebetween, an impedance-coupling means having two secondary elements which are substantially 90 degrees displaced and a primary element relatively movable with respect to said secondary elements, the relative positions of said secondary elements with respect to the primary element determining the electrical coupling between the primary element and the respective secondary elements, means for effectively mechanically coupling said primary element to one of said members, means for effectively mechanically coupling said secondary elements to the other of said members, means for supplying to said primary element oscillations of a frequency much greater than the effective maximum frequency of said motion between said two members, whereby there are applied to said secondary elements oscillations the amplitudes of which are modulated in accordance with said relative motion between said two members, means respectively connected to each of said secondary elements for synchronously rectifying said oscillations coupled thereto to obtain unidirectional voltages pulsating in accordance with said motion, a cathode-ray tube, means for respectively utilizing each of said pulsating unidirectional voltages to deflect the cathode-ray beam of said tube in two directions normal to each other to produce a rotary synchronous indication of said motion between said two members, and means for modulating the oscillations supplied to said primary element to modulate the radius of the rotary synchronous indication provided by said cathode-ray beam.

JOHN KELLY JOHNSON.